(12) United States Patent
Umeyama et al.

(10) Patent No.: US 10,018,277 B2
(45) Date of Patent: Jul. 10, 2018

(54) FLOW RATE CONTROL VALVE AND MASS FLOW CONTROLLER USING THE SAME

(71) Applicant: Hitachi Metals, Ltd., Minato-ku, Tokyo (JP)

(72) Inventors: Takahiro Umeyama, Mie (JP); Keiko Watanabe, Tokyo (JP); Toshihiko Shimizu, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/764,262

(22) PCT Filed: Mar. 28, 2014

(86) PCT No.: PCT/JP2014/059087
§ 371 (c)(1),
(2) Date: Jul. 29, 2015

(87) PCT Pub. No.: WO2014/188785
PCT Pub. Date: Nov. 27, 2014

(65) Prior Publication Data
US 2015/0369378 A1     Dec. 24, 2015

(30) Foreign Application Priority Data

May 24, 2013    (JP) ................................ 2013-109493

(51) Int. Cl.
*G05D 7/06*      (2006.01)
*F16K 7/16*      (2006.01)
(Continued)

(52) U.S. Cl.
CPC ................. *F16K 7/16* (2013.01); *F16K 1/42* (2013.01); *F16K 7/12* (2013.01); *F16K 7/123* (2013.01);
(Continued)

(58) Field of Classification Search
CPC ... F16K 1/42; F16K 25/00; F16K 7/12; F16K 7/123; F16K 7/14; F16K 7/16;
(Continued)

(56) References Cited

U.S. PATENT DOCUMENTS 5,413,311 A    5/1995   Arstein et al.
6,062,246 A *   5/2000   Tanaka ................. G05D 7/0635
                                                 137/12

FOREIGN PATENT DOCUMENTS

EP         0 780 611 A1    6/1997
JP         51-34029          3/1976
(Continued)

OTHER PUBLICATIONS

Korean-language Office Action issued in counterpart Korean Application No. 10-2015-7020487 dated Oct. 24, 2016 with English translation (10 pages).
(Continued)

*Primary Examiner* — William McCalister
(74) *Attorney, Agent, or Firm* — Crowell & Moring LLP

(57) ABSTRACT

A flow rate control valve capable of eliminating an extra operation of a diaphragm spacer after a valve has become a closed state and shortening a response time is provided. It has an annular valve seat 115, a diaphragm 116 including a thin plate-shaped elastic body an outer peripheral part of which has been fixed, and a diaphragm spacer 117 located on the opposite side of the valve seat 115 with the diaphragm 116 interposed therebetween, and the annular valve seat 115, the diaphragm 116 and the diaphragm spacer 117 are coaxially disposed. And, it is structured that the annular valve seat 115 has, on its top, an inclined surface 123 inclined to the inner peripheral side, and the diaphragm 116 is displaced in a direction of the valve seat 115 and the inclined surface 123 on the top of the valve seat 115 and the diaphragm 116 abut
(Continued)

against with no gap by pressing force of the diaphragm spacer 117.

5 Claims, 8 Drawing Sheets

(51) Int. Cl.
| | |
|---|---|
| *F16K 1/42* | (2006.01) |
| *F16K 7/12* | (2006.01) |
| *F16K 7/14* | (2006.01) |
| *F16K 25/00* | (2006.01) |
| *G05D 7/01* | (2006.01) |
| *F16K 31/00* | (2006.01) |

(52) U.S. Cl.
CPC ............... *F16K 7/14* (2013.01); *F16K 25/00* (2013.01); *F16K 31/007* (2013.01); *G05D 7/0113* (2013.01); *G05D 7/0635* (2013.01); *Y10T 137/7759* (2015.04)

(58) Field of Classification Search
CPC ................ G05D 7/0113; G05D 7/0635; Y10T 137/7759; Y10T 137/7761
See application file for complete search history.

(56) References Cited

FOREIGN PATENT DOCUMENTS

| | | |
|---|---|---|
| JP | 5-66376 U | 9/1993 |
| JP | 9-178005 A | 7/1997 |
| JP | 11-65670 A | 3/1999 |
| JP | 2010-159790 A | 7/2010 |

OTHER PUBLICATIONS

International Search Report (PCT/ISA/210) dated Jun. 24, 2014 with English translation (six pages).

\* cited by examiner

2

FLOW RATE CONTROL VALVE AND MASS FLOW CONTROLLER USING THE SAME

TECHNICAL FIELD

The present invention relates to a flow rate control valve capable of precisely controlling a mass flow rate of gas and so forth and a mass flow controller using the same.

BACKGROUND ART

Conventionally, as a flow rate control valve using a diaphragm, there is the flow rate control valve described in Japanese Patent Application Laid-Open No. 2010-159790 (Patent Document 1). In the flow rate control valve in Patent Document 1, a diaphragm pressing surface of a diaphragm spacer is made such that a central part located more inward than a tip diameter of an annular valve seat is formed as a plane surface or a gently curved surface, and a peripheral edge part located more outward than the tip diameter of the annular valve seat is formed as a tapered surface that is more recessed than a virtual surface where the central part has been extended. The annular valve seat is of a shape that its leading end part is made as a flat surface and it has tapered surfaces on the outer peripheral side and the inner peripheral side bordering on the flat surface, and has a structure that the diaphragm abuts against the flat surface of the annular valve seat leading end part by pressing force of the diaphragm spacer.

CITATION LIST

Patent Document

Patent Document 1: Japanese Patent Application Laid-Open No. 2010-159790

SUMMARY OF THE INVENTION

Technical Problem

In a configuration in the above-mentioned Patent Document 1, since an abutting surface of the annular valve seat that abuts against the diaphragm is the flat surface, when the diaphragm is in contact with the flat surface of the above-mentioned annular valve seat, the surface of the diaphragm is not parallel with the above-mentioned flat surface, and it is necessary to further add a load on the diaphragm spacer. Then, local deformation of the diaphragm progresses until no gap is left between the diaphragm and the flat surface of the annular valve seat. Since this operation occurs not only in valve closing operation of the flow rate control valve but also at valve opening operation similarly, it causes occurrence of a delay in response time of the flow rate control valve.

An object of the present invention is to provide a flow rate control valve capable of shortening the response time and a mass flow controller using the same.

Solution to the Problem

In order to solve the above-mentioned problem, the present invention is characterized by configuring the flow rate control valve such that it has an annular valve seat, a diaphragm including a thin plate-shaped elastic body an outer peripheral part of which has been fixed and a diaphragm spacer located on the opposite side of the valve seat with the diaphragm interposed therebetween, the valve seat, the diaphragm and the diaphragm spacer are coaxially disposed, and the valve seat has, on its top, an inclined surface inclined to the inner peripheral side, and the diaphragm abuts against the inclined surface of the diaphragm by pressing force of the diaphragm spacer.

Advantageous Effects of the Invention

According to the present invention, the flow rate control valve capable of shortening the response time can be provided. In addition, the mass flow controller capable of shortening a valve open/close response time relative to a set flow rate can be provided.

Problems, configurations and advantageous effects other than the above will become apparent from the following description of embodiments.

DESCRIPTION OF EMBODIMENTS

Figure 1:
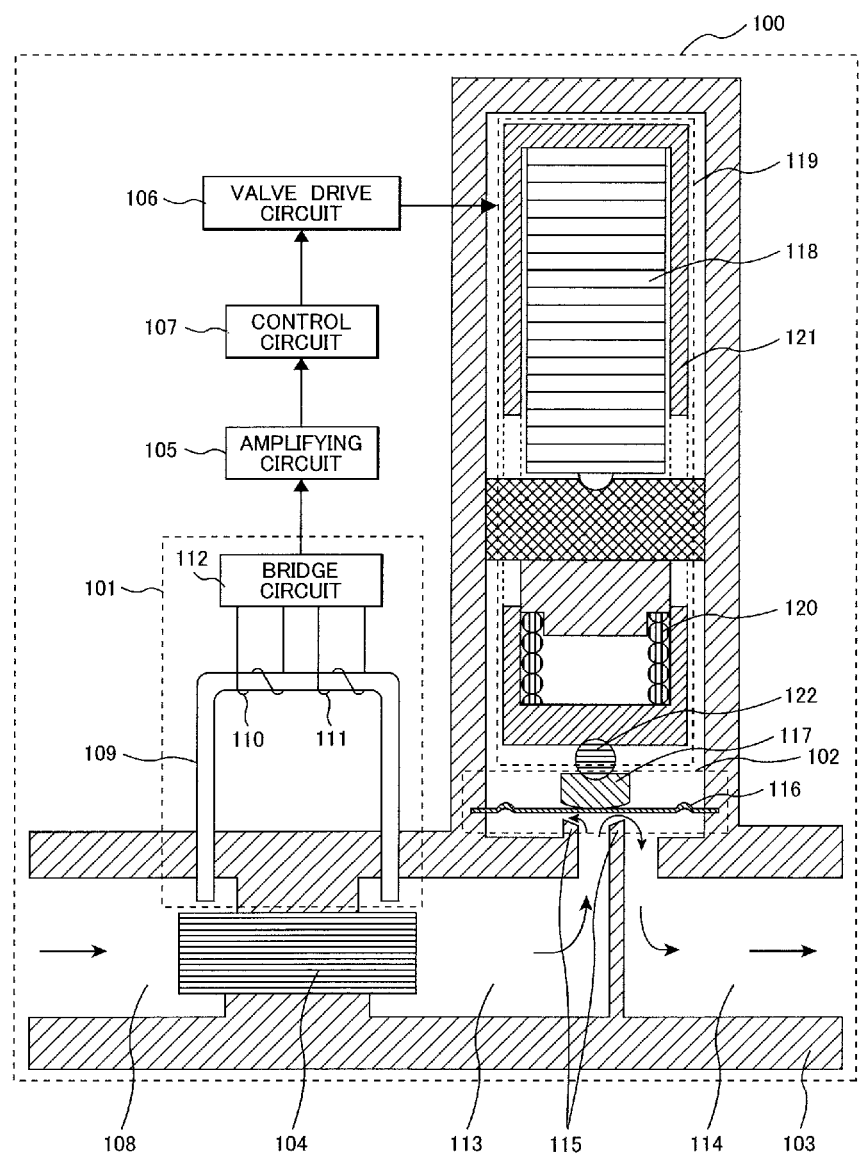
FIG. 1 is a sectional diagram of a mass flow controller of the present invention.

In the following, embodiments of the present invention will be described by using the drawings. FIG. 1 is a sectional diagram of a mass flow controller of the present invention. A mass flow controller 100 has a flow rate sensor unit 101, a flow rate control valve 102, a main body 103, a bypass passage 104, an amplifying circuit unit 105, a valve drive circuit unit 106, and a control circuit unit 107.

The flow rate sensor unit 101 detects a mass flow rate of a fluid that is branched from the middle of an inflow passage 108 and flows in a sensor passage 109. Coils 110, 111 are respectively wound upstream and downstream of the sensor passage 109, and configure a bridge circuit 112 in combination with not shown other resistors. A temperature difference occurred between the coil 110 and the coil 111 is detected as a potential difference between nodes of the bridge circuit 112, and the flow rate is calculated on the basis of data on this potential difference.

The bypass passage 104 has a structure that, for example, the same piping as that of the sensor passage 109 has been bundled by a necessary number, and the fluid that has flown in through the inflow passage 108 is branched into the bypass passage 104 and the sensor passage 109 in a predetermined flow ratio. The fluids that have passed through the bypass passage 104 and sensor passage 109 join together on the inlet side of an intermediate passage 113 and flow toward the flow rate control valve 102.

The flow rate control valve 102 comprises a valve seat 115 disposed between the intermediate passage 113 and an outflow passage 114, a diaphragm 116 whose outer peripheral edge is nipped and held and that comes into and out of contact with the valve seat 115, and a diaphragm spacer 117 that is located opposite to the valve seat side of the diaphragm 116 and presses the diaphragm 116 against the valve seat 115.

As a power source for opening/closing the flow rate control valve 102, an actuator 119 including, for example, a laminated piezoelectric element body 118 is used. Although in a state where a valve drive voltage is not applied, the diaphragm 116 is pressed by a spring member 120 against the valve seat 115 and is in a valve-closed state, when the valve drive voltage is applied, the laminated piezoelectric element body 118 extends against the spring member 120.

As a result, a housing 121 that wraps the laminated piezoelectric element body 118 moves in a direction going away from the diaphragm 116, diaphragm pressing force of the diaphragm spacer 117 that is coupled with the housing 121 via a hard sphere 122 is reduced, the diaphragm 116 returns to a planar shape, and a gap is generated between the diaphragm 116 and the valve seat 115. The fluid that has flown into the flow rate control valve 102 through the intermediate passage 113 moves to the outflow passage 114 passing through the above-mentioned gap and is discharged to the outside of the mass flow controller 100.

A detected flow rate signal at the flow rate sensor unit 101 is amplified by the amplifying circuit unit 105 and thereafter is input into the control circuit unit 107. Here, the above-mentioned detected flow rate signal is compared with a set flow rate signal that has been set from the outside, a drive signal with which a difference between these two signals would be reduced to 0 is input into the actuator 119 via the valve drive circuit unit 106, the opening degree of the flow rate control valve 102 is adjusted and the flow rate is controlled. A series of these controls is performed by the control circuit unit 107. Incidentally, here, the control circuit is configured by a CPU, a RAM, a ROM and so forth that are not particularly shown, and the CPU reads out a control program memorized in the ROM, and calculates the above-mentioned drive signal on the basis of the above-mentioned detected flow rate signal and set flow rate signal stored in the RAM, and thereby the series of above-mentioned controls is executed.

Figure 2:
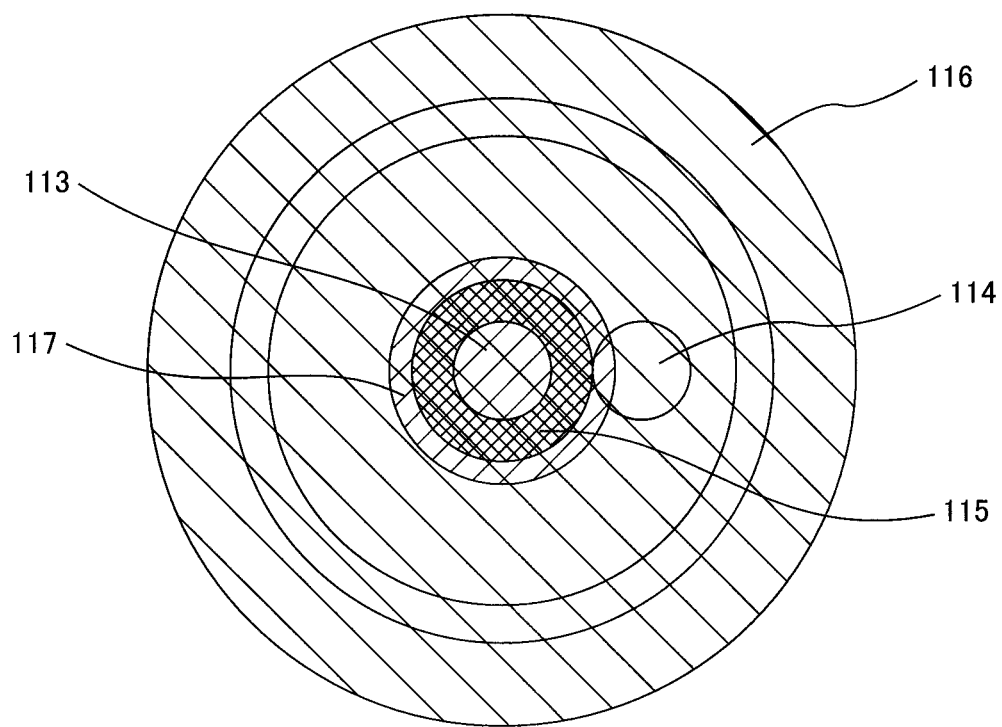
FIG. 2 is a plan perspective view of a flow rate control valve of the mass flow controller.

FIG. 2 is a plan perspective view of the flow rate control valve of the mass flow controller. The diaphragm 116, the diaphragm spacer 117 and the valve seat 115 are coaxially disposed. The diaphragm 116 is a leaf spring including an elastic almost circular metal thin plate. When the load is gradually added to the diaphragm 116 via the diaphragm spacer 117, it is elastically deformed in a direction that a radius of curvature of the diaphragm 116 becomes small and a central part of the diaphragm 116 is convexly displaced to the valve seat 115 side. When elastic deformation further progresses and the diaphragm 116 abuts against the valve seat 115, the gap between the valve seat 115 and the diaphragm 116 is disappeared, and the flow rate control valve 102 becomes a closed state.

Conversely, when the load on the diaphragm 116 is gradually removed via the diaphragm spacer 117, the diaphragm 116 is elastically deformed in a direction that the radius of curvature becomes large by restoring force of the leaf spring of the metal thin plate that configures the diaphragm 116, and the central part thereof returns to its original planar shape. As a result, the gap is formed between the valve seat 115 and the diaphragm 116, and the flow rate control valve 102 becomes an open state.

In the present embodiment, the valve seat 115 is a cylindrical body that is disposed upright toward the diaphragm 116, is made annular, and has an inclined surface on its top as shown by its sectional shape in FIG. 1. This inclined surface is shaped such that spacing with the diaphragm 116 that faces it is increased as it goes from the outer peripheral side toward the inner peripheral side. Then, when the diaphragm 116 abuts against the inclined surface formed on the top of the valve seat 115 by pressing force of the diaphragm spacer 117, the gap is lost between an abutting surface of the diaphragm 116 and the inclined surface (an abutting surface with the diaphragm 116) of the valve seat 115, and the flow rate control valve 102 becomes the valve-closed state. Thereby, further application of extra pressing force by the diaphragm spacer 117 to the diaphragm 116 still after the diaphragm 116 has come into contact with the valve seat 115 can be avoided, and it becomes possible to shorten the response time of the flow rate control valve 102.

In the following, embodiments will be described by using the drawings. Incidentally, although in the following, configurations of the flow rate control valves will be described, the above-mentioned mass flow controller can be configured by using these flow rate control valves. In addition, the same numerals are assigned to the same configurations.

Embodiment 1

Figure 3:
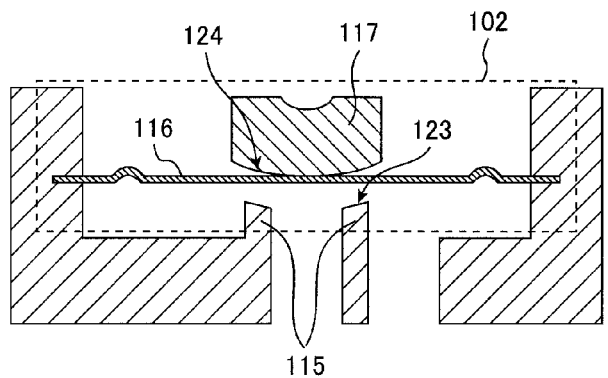
FIGS. 3(A)-3(D) are enlarged sectional diagrams of a flow rate control valve of the present invention.
Figure 3:
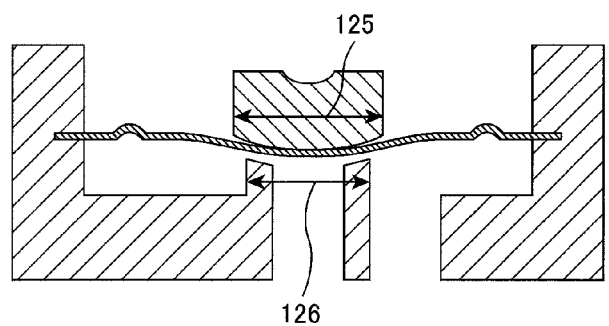
Figure 3:
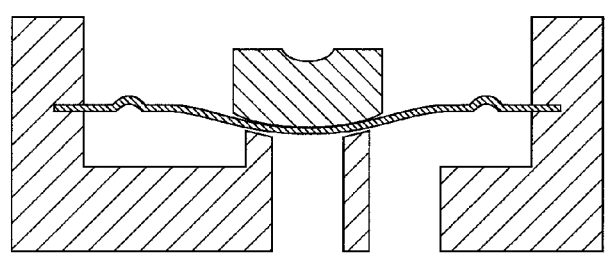
Figure 3:
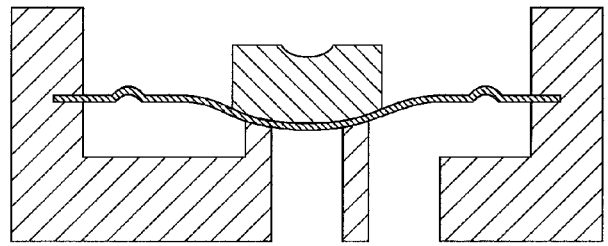

FIG. 3 is enlarged sectional diagrams of the flow rate control valve of the present invention. It shows changes in deformation of the diaphragm 116 and opening degree of the flow rate control valve 102 when the load is gradually added via the diaphragm spacer 117. In the present embodiment, shapes of an inclined surface 123 formed on the top of the valve seat 115 and a diaphragm pressing surface 124 of the diaphragm spacer 117 are made as parts of a spherical surface, and an outer diameter 125 of the diaphragm spacer is configured to be larger than an outer diameter 126 of the valve seat. Namely, the inclined surface 123 that is the abutting surface with the diaphragm 116 is formed into a shape that has been approximated by making its shape as the part of the spherical surface. Therefore, the inclined surface 123 and the diaphragm pressing surface 124 that corresponds to the position of the inclined surface 123 become a state of coming into engagement via the diaphragm 116 when they abut against the diaphragm 116 by the pressing force of the diaphragm spacer 117.

FIG. 3(A) shows a state where the load is not added to the diaphragm 116 (a state where the pressing force is not applied), and the central part of the diaphragm 116 is in the form of a planar shape. The gap is present between the inclined surface 123 of the valve seat 115 and the diaphragm 116, and the flow rate control valve 102 is in the opened state.

FIG. 3(B) is a state where the load has been added to the diaphragm 116 from the state in (A). The central part of the diaphragm 116 is elastically deformed to be convex in a direction of the inclined surface 123 of the seat valve 115, the gap between the inclined surface 123 of the valve seat 115 and the diaphragm 116 is present though it becomes small, and the flow rate control valve 102 is in the opened state.

Although FIG. 3(C) is a state where the load has been further added from the state in (B), it is elastically deformed in a direction that the radius of curvature of the entire diaphragm becomes smaller than the time in (B), and the central part of the diaphragm 116 is displaced more convexly to the inclined surface 123 side of the valve seat 115. Although the gap between the inclined surface 123 of the valve seat 115 and the diaphragm 116 becomes further smaller, it is still present, and the flow rate control valve 102 is in the opened state.

FIG. 3(D) is a state where the load has been further added from the state in (C), and the diaphragm 116 has first abutted against the inclined surface 123 of the valve seat 115. The diaphragm 16 is elastically deformed in a direction that the radius of curvature becomes further smaller than in the state in (C), the gap that has been ever present between the inclined surface 123 of the valve seat 115 and the diaphragm 116 is disappeared, and the flow rate control valve 102 becomes the closed state here for the first time. Since, in this state, the inclined surface 123 on the top of the valve seat 115 and the surface of the diaphragm 116 are parallel with each other, the diaphragm 116 abuts against the inclined surface 123 of the valve seat 115 with no gap. On the other hand, since also the diaphragm spacer 117 abuts against the inclined surface 123 of the valve seat 115 with no gap in (D), it is impossible to push in the diaphragm spacer 117 anymore. That is, the inclined surface 123 (the abutting surface with the diaphragm) of the valve seat 115 and the diaphragm pressing surface 124 (the abutting surface with the diaphragm) of the diaphragm spacer 117 at the position corresponding to this inclined surface 123 become the state where they have been engaged via the diaphragm 116. The above-mentioned operations reversibly occur also when valve-opening the flow rate control valve 102.

Figure 4:
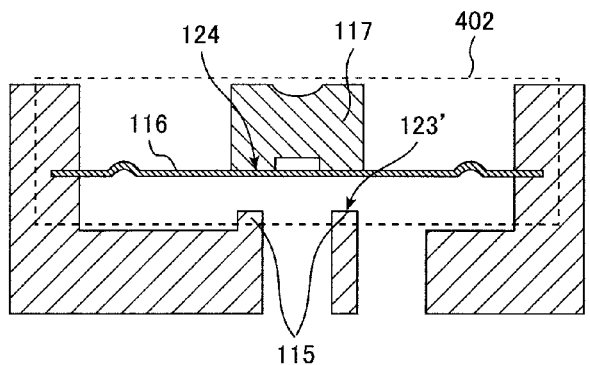
FIGS. 4(A)-4(D) are enlarged sectional diagrams of a flow rate control valve of a comparative example.
Figure 4:
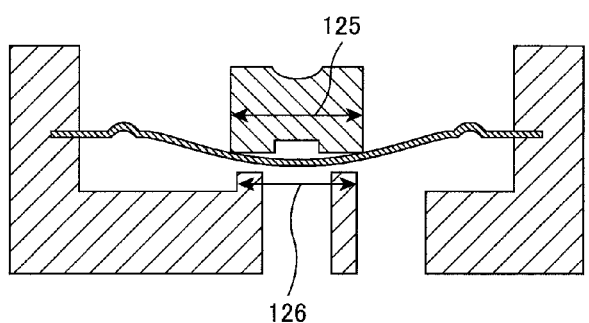
Figure 4:
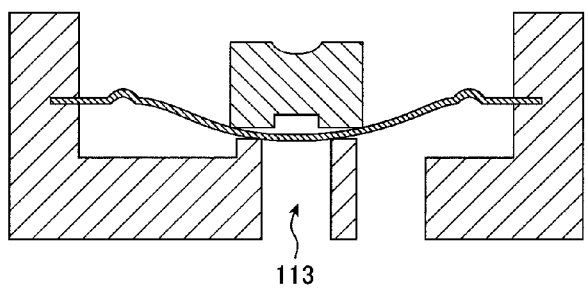
Figure 4:
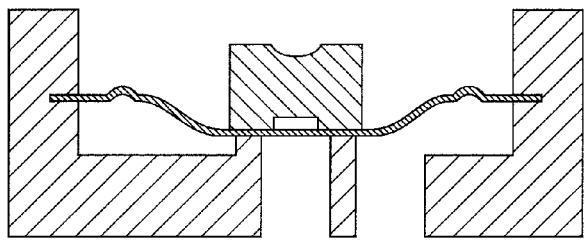

FIG. 4 is enlarged sectional diagrams of a flow rate control valve of a comparative example. Similarly to FIG. 3, changes in deformation of the diaphragm 116 and opening degree of a flow rate control valve 402 when the load is gradually added via the diaphragm spacer 117 are sequentially shown in (A), (B), (C), (D). The diaphragm pressing surface 124 of the diaphragm spacer 117 forms a flat surface, and also an abutting surface with the diaphragm 116 on the top of the valve seat 115 forms a flat surface 123'. The outer diameter 126 of the valve seat 115 is so configured as to be smaller than the outer diameter 125 of the diaphragm spacer 117.

When the load is gradually added to the diaphragm 116, it is elastically deformed in the direction that the radius of curvature of the entire diaphragm becomes small, and the central part of the diaphragm 116 is convexly displaced to the valve seat 115 side. Then, when the load is further added, elastic deformation of the diaphragm 116 further progresses, the central part of the diaphragm 116 returns to the planer shape and elastic deformation is completed as shown in (D). The above-mentioned operations reversibly occur also when valve-opening the flow rate control valve 402.

On the other hand, when focusing on the opening degree of the valve, in a state in (C) before (D) that the diaphragm 116 has abutted against the flat surface 123' on the top of the valve seat 115 with no gap, the diagram 116 abuts first against the inner peripheral side of the flat surface 123' of the valve seat 115, and the flow rate control valve 402 becomes the closed state. At this time, the central part of the diaphragm 116 is displaced slightly closer to the intermediate passage 113 side than to the flat surface 123' on the top of the valve seat. In (C), since only the inner peripheral side of the flat surface 123' of the valve seat 115 and the outer peripheral side of the diaphragm pressing surface 124 of the diaphragm spacer 117 abut against the diaphragm 116, and the gap is present between it and the diaphragm 116 on the not abutting sides, that is, the inner peripheral side of the diaphragm pressing surface 124 and the outer peripheral side of the flat surface 123' of the valve seat 115, elastic deformation of the diaphragm 116 is not completed in the state in (C), and it progresses up to the state in (D). At this time, the central part of the diaphragm 116 returns to the position of the flat surface 123' on the top of the valve seat. Then, in this state, the flat surface 123' on the top of the valve seat 115 and the diaphragm pressing surface 124 at the position corresponding to the flat surface 123' are brought into the engaged state via the diaphragm 116, it becomes impossible to push in the diaphragm spacer 117 toward the valve seat 115 side anymore and it mechanically stops.

In the operation of closing the flow rate control valve 402, it is difficult to repeatedly reproduce the state in (C), and in order to safely and surely close the flow rate control valve 402, it is necessary to elastically deform the diaphragm 116 up to the state in (D). That is, in the flow rate control valve 402 of the comparative example, an extra operation of the diaphragm spacer 117 between (C) and (D) is present and a delay occurs in the valve-closing operation.

In contrast, in the present embodiment, when the diaphragm 116 first abuts against the inclined surface 123 on the top of the valve seat 115, the diaphragm 116 abuts against the inclined surface 123 of the valve seat with no gap.

Figure 5:
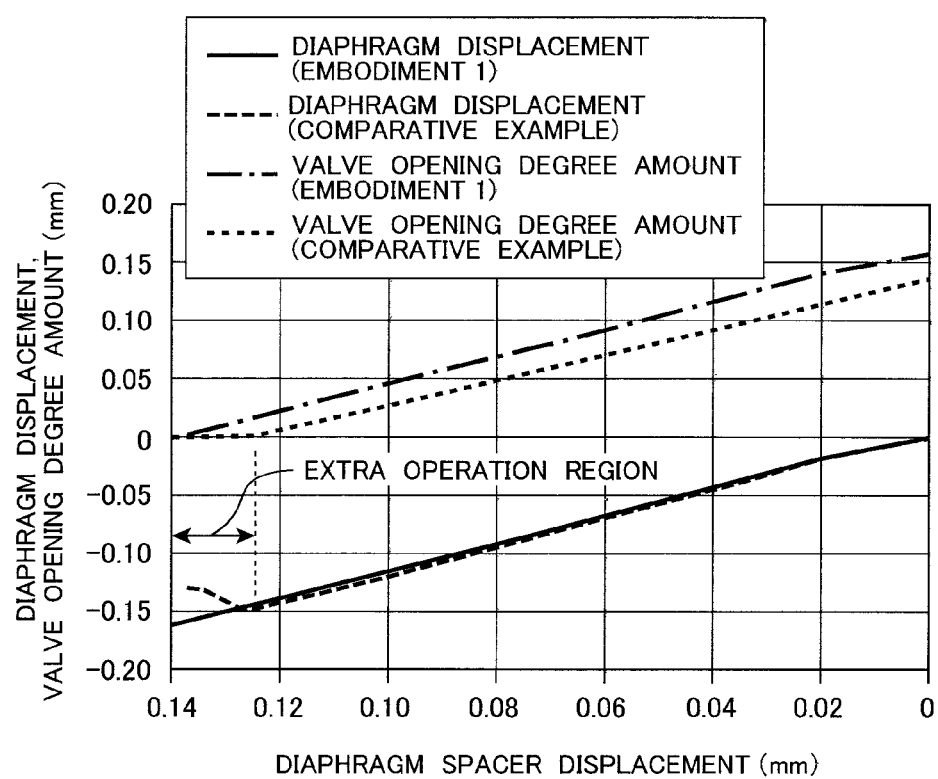
FIG. 5 is a relationship diagram among displacement of a diaphragm spacer, displacement of a diaphragm and a valve opening degree amount.

FIG. 5 is a relationship diagram among displacement of the diaphragm spacer, displacement of the diaphragm and a valve opening degree amount. This relationship diagram shows a result of simulation showing the relationship among the displacement of the diaphragm spacer, the displacement of the central part of the diaphragm and the valve opening degree amount of the flow rate control valve. This result of simulation is a result of contact/large deformation analysis of the diaphragm by a general-purpose structure analysis tool ANSYS (a tool manufactured by ANSYS Inc. (USA)) using a finite-element method, and analysis conditions are 21000 kgf/mm$^2$ in Young's modulus and 0 in friction factor of a contact part for both of the diaphragm and the diaphragm spacer. In central part displacement of the diaphragm, a direction going away from the valve seat and a direction coming closer to the valve seat were expressed by a plus direction and a minus direction, and a state where the load is not added to the diaphragm was set as 0. The valve opening degree amount is a distance in a direction that is parallel with the central axes of the valve seat and the diaphragm between the inner peripheral side of the top of the valve seat and the diaphragm.

In the comparative example, when the displacement of the diaphragm spacer is 0.125 mm, the central part of the diaphragm comes closest to the valve seat and the valve opening degree amount is reduced to 0 in this state. Further, although when the displacement is increased to a maximum of 0.140 mm, the central part of the diaphragm is displaced in the direction going away from the valve seat, the valve opening degree amount remains at 0 and stays unchanged. That is, in a region that the displacement of the diaphragm spacer ranges from 0.125 mm to 0.140 mm, a change in state from (C) to (D) in FIG. 3 is reproduced.

In contrast, in the present embodiment, with the diaphragm spacer displacement of the maximum of 0.140 mm, the central part of the diaphragm most approaches the valve seat, and the valve opening degree amount is reduced to 0 in this state. That is, unlike the comparative example, it is seen that the extra operation of the diaphragm spacer after the valve has become the closes state is lost, and the delay in valve opening operation caused by this is eliminated. From this, according to the present embodiment, the flow rate control valve capable of shortening the response time can be implemented.

In the present embodiment, although it has been described that the shape of the diaphragm pressing surface 124 of the diaphragm spacer 117 and the shape of the inclined surface 123 on the top of the valve seat 115 that is the abutting surface with the diaphragm 116 are made as the shapes that have been approximated as the parts of the same spherical surface, specifically, they are formed such that the radiuses of curvature of the inclined surface 123 on the top of the valve seat and the diaphragm pressing surface 124 of the diaphragm spacer 117 are made the same as each other, and the center of the virtual circle thereof is present on the common central axis.

Incidentally, although in the present embodiment, also the shape of the diaphragm pressing surface 124 of the diaphragm spacer 117 at the position corresponding to the inclined surface 123 on the top of the valve seat was made as the shape to be approximated as the part of the same sphere similarly to the inclined surface 123 of the valve seat, it is not limited thereto and the same advantageous effects can be obtained even if it has another shape.

Embodiment 2

Figure 6:
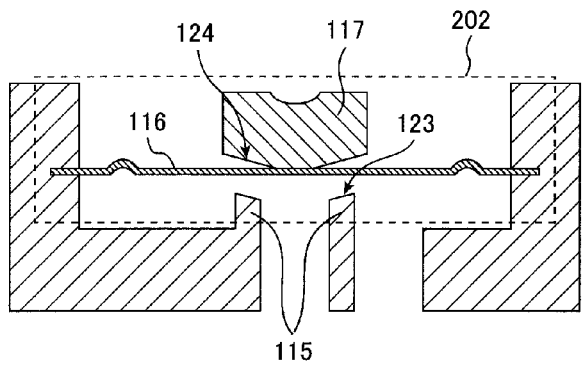
FIGS. 6(A)-6(D) are enlarged sectional diagrams of a flow rate control valve of the present invention.
Figure 6:
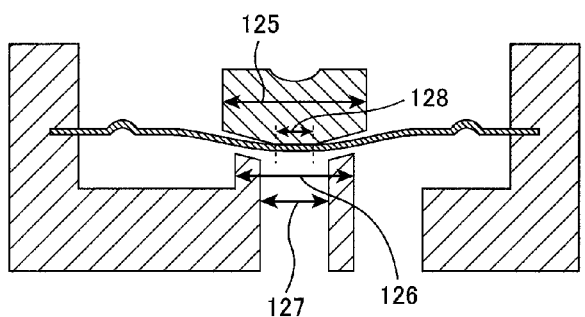
Figure 6:
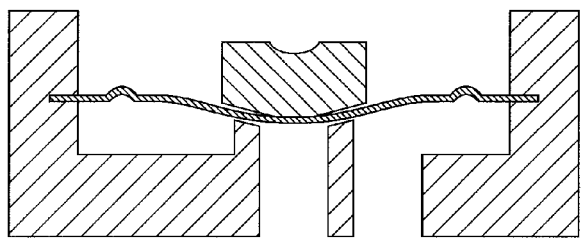
Figure 6:
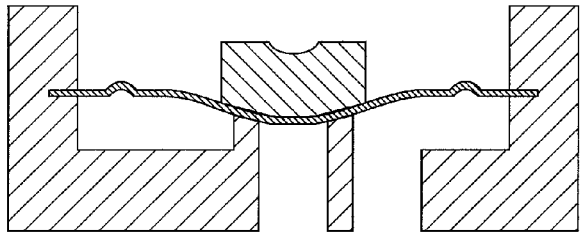

FIG. 6 is enlarged sectional diagrams of the flow rate control valve of the present invention. A point that is different from Embodiment 1 is that the inclined surface 123 on the top of the valve seat 115 and the diaphragm pressing surface 124 of the diaphragm spacer 117 are formed into shapes that have been approximated as parts of a conical surface. That is, a region of the outer diameter 128 of a leading end of the diaphragm pressing surface 124 of the diaphragm spacer 117 is formed as a flat surface, and a region from this outer diameter 128 to the outer peripheral side of the pressing surface 124 is formed as a tapered-shape that is defined as a part of the above-mentioned cone. Here, a magnitude correlation among diameters of respective parts of the diaphragm spacer 117 and the valve seat 115 will be described in the following. They are in a relation that an inner diameter 127 of the valve seat 115 is larger than an outer diameter 128 of the leading end of the diaphragm pressing surface 124 of the diaphragm spacer 117, and the outer diameter 126 of the inclined surface 123 on the top of the valve seat 115 is smaller than the outer diameter 125 of the diaphragm pressing surface 124.

Similarly to FIG. 3, the changes in deformation of the diaphragm 116 and opening degree of a flow rate control valve 202 when the load was gradually added via the diaphragm spacer 117 are sequentially shown in (A), (B), (C), (D). In the flow rate control valve 102 in FIG. 3, description is omitted in regard to parts having the same functions as the configurations to which the same numerals as those shown in already described FIG. 3 have been assigned.

When the load is gradually added to the diaphragm 116, it is elastically deformed in the direction that the radius of curvature of the entire diaphragm becomes small, and the central part of the diaphragm 116 is convexly displaced to the valve seat 115 side. Then, in a state in (C), the diaphragm 116 abuts against first the inclined surface 123 on the top of the valve seat 115, and the flow rate control valve 202 becomes the closed state.

At this time, since the inclined surface 123 on the top of the valve seat 115 and the surface of the diaphragm 116 are not parallel with each other, the gap is present between the diaphragm 116 and the inclined surface 123 on the top of the valve seat.

As a result, although elastic deformation of the diaphragm 116 is not completed in the state in (C) and progresses up to the state in (D), the gap in the state in (C) is small in comparison with the gap that is present in the state in (C) in the flow rate control valve 402 of the comparative example.

Figure 7:
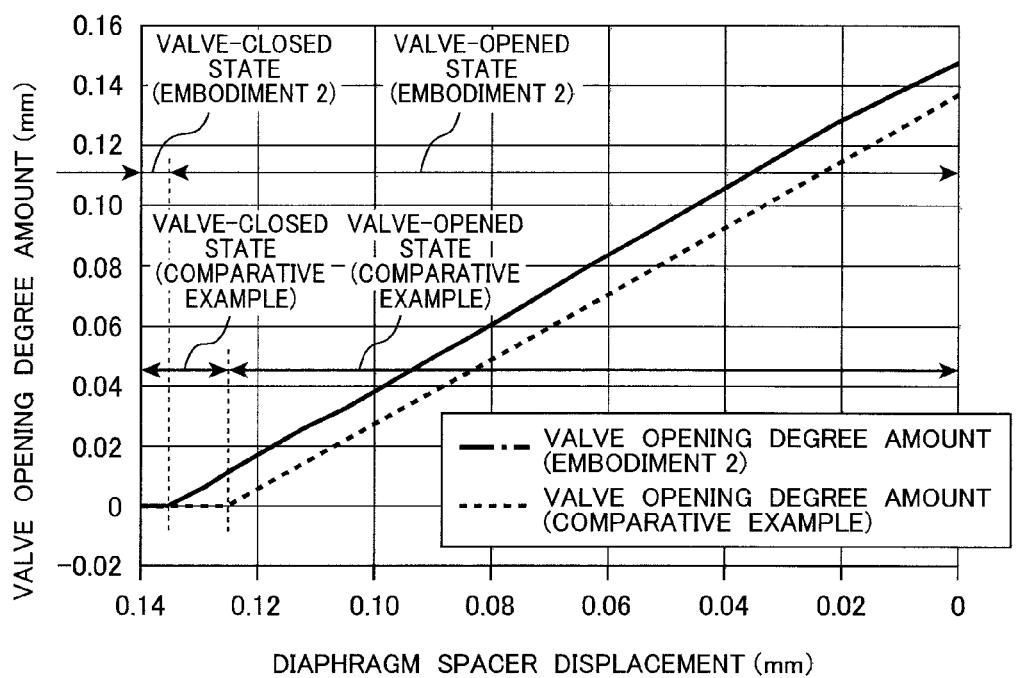
FIG. 7 is a relationship diagram between the displacement of the diagram spacer and the valve opening degree amount.

FIG. 7 is a relationship diagram between the displacement of the diaphragm spacer and the valve opening degree amount. The relationship diagram shows a result of simulation, and since the simulation conditions are the same as those in FIG. 5, description thereof is omitted. The displacement with which the valve opening degree amount is reduced to 0 is 0.135 mm in the present embodiment relative to 0.125 mm of the comparative example. It is seen that in comparison with the comparative example, the extra operation of the diaphragm spacer after the flow rate control valve has become the closed state is reduced, and to shorten the response time when valve-opening relative to the set flow rate is done. This operation reversibly occurs also when valve-opening the flow rate control valve 202. From this, also in the present embodiment, the flow rate control valve capable of shortening the response time can be implemented. Incidentally, in Embodiment 1, the diaphragm pressing surface of the diaphragm spacer 117 was formed into the approximated shape as the part of the spherical surface. In contrast, since in the present embodiment, it is the one of the shape that the central part (the leading end) of the pressing surface is formed as the flat surface and it has the tapered shape from this flat surface toward the outer peripheral side by approximating it as the part of the cone, it has advantages in comparison with Embodiment 1 with respect to the point of manufacture or processing.

Embodiment 3

Figure 8:
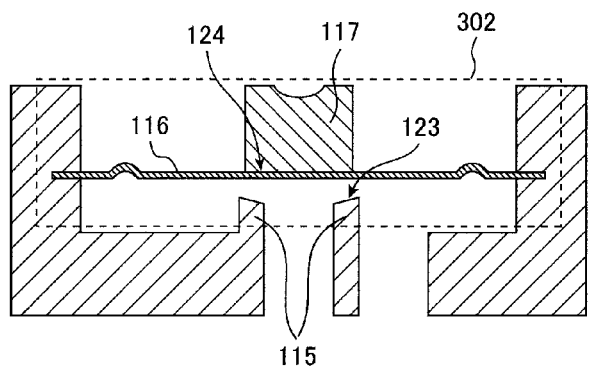
FIGS. 8(A)-8(D) are enlarged diagrams of a flow rate control valve of the present invention.
Figure 8:
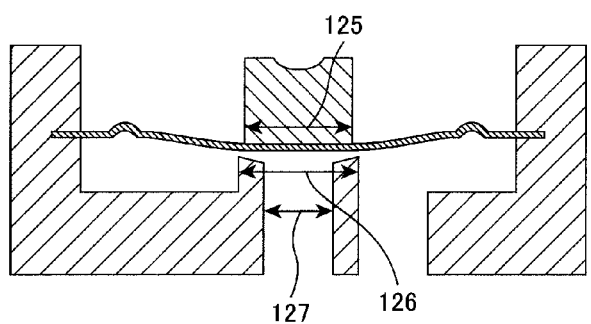
Figure 8:
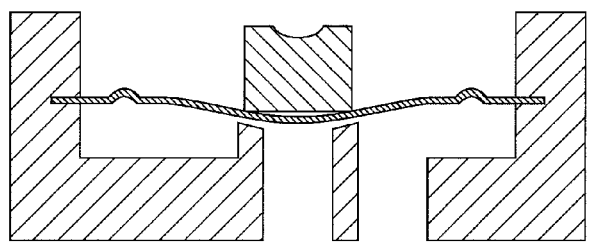
Figure 8:
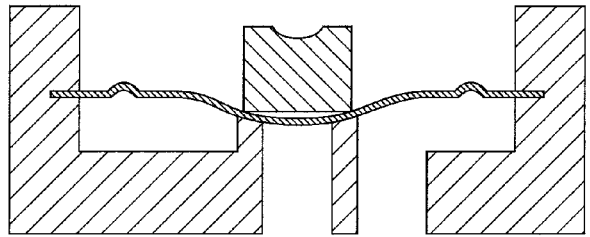

FIG. 8 is enlarged sectional diagrams of a flow rate control valve of the present invention. The present embodiment is different from the above-mentioned Embodiment 1 and Embodiment 2 in that the diaphragm pressing surface 124 of the diaphragm spacer 117 that configures a flow rate control valve 302 was formed into a flat shape and that the outer diameter 125 of the diaphragm spacer 117 was made smaller than the outer diameter 126 of the inclined surface 123 on the top of the valve seat 115.

Similarly to FIG. 3, the changes in deformation of the diaphragm 116 and opening degree of the flow rate control valve 302 when the load has been gradually added via the diaphragm spacer 117 are sequentially shown in (A), (B), (C), (D). In the flow rate control valve 102 in FIG. 3, description is omitted, in regard to parts having the same functions as the configurations to which the same numerals as those shown in already described FIG. 3 have been assigned.

When the load is gradually added to the diaphragm 116, it is elastically deformed in the direction that the radius of curvature of the entire diaphragm becomes small, and the central part of the diaphragm 116 is convexly displaced to the valve seat 115 side. Then, in a state in (D), the gap that has been present between the inclined surface 123 on the top of the valve seat 115 and the diaphragm 116 is lost and the flow rate control valve 302 becomes the closed state here for the first time.

Since, in this state, the inclined surface 123 on the top of the valve seat and the surface of the diaphragm 116 are parallel with each other, the diaphragm 116 abuts against the valve seat 115 with no gap.

On the other hand, although, on the diaphragm spacer 117 side, the gap is present between it and the diaphragm 116, since the diaphragm 116 and the valve seat 115 abut against each other with no gap, it is impossible to push in the diaphragm spacer 117 anymore. As a result, there is no such extra operation of the diaphragm spacer after the valve has become the closed state as observed in the comparative example, and the response time relative to the set flow rate can be shortened. This operation reversibly occurs also when valve-opening the flow rate control valve 302. Thereby, according to the present embodiment, the flow rate control valve capable of shortening the response time can be implemented.

As in the present embodiment, it is preferable to configure the outer diameter 125 of the diaphragm spacer to be larger than the inner diameter 127 of the valve seat such that at least a part of the diaphragm pressing surface 124 of the diaphragm spacer is present at the position corresponding to the inclined surface 123 on the top of the valve seat. Owing to this configuration, it becomes possible to regulate deformation of the diaphragm 116 and to perform the sure closing operation of the flow rate control valve 302.

Within a range that satisfies the above-mentioned configuration, the outer diameter and the inner diameter of the inclined surface 123 on the top of the valve seat and the diaphragm pressing surface 124 of the diaphragm spacer may be R-chamfered or square-chamfered, and it is effective for improving durability of the flow rate control valve 302.

Incidentally, the present invention is not limited to the above-mentioned embodiments and various modified examples are included. For example, the above-mentioned embodiments have been described in detail for ready understanding of the present invention, and it is not necessarily limited to those provided with all of the configurations that have been described. In addition, it is also possible to replace a part of a configuration of a certain embodiment with a configuration of another embodiment, and it is also possible to add a configuration of another embodiment to a configuration of a certain configuration.

In addition, although as the embodiment of the present invention, the normally closed type mass flow controller that the flow rate control valve becomes the closed state when the valve drive voltage is not applied has been described, it is also possible to replace it with a normally open type mass flow controller that structures of the spring member 120 and so forth have been modified.

REFERENCE SIGNS LIST

100 . . . mass flow controller, 102 . . . flow rate control valve of Embodiment 1, 115 . . . valve seat, 116 . . . diaphragm, 117 . . . diaphragm spacer, 123 . . . inclined surface on top of valve seat, 124 . . . diaphragm pressing surface of diaphragm spacer, 125 . . . outer diameter of diaphragm pressing surface, 126 . . . outer diameter of inclined surface on top of valve seat, 127 . . . inner diameter of inclined surface on top of valve seat, 202 . . . flow rate control valve of Embodiment 2, 302 . . . flow rate control valve of Embodiment 3, 402 . . . flow rate control valve of comparative example

The invention claimed is:

1. A flow rate control valve, comprising:
a valve seat that is a cylindrical body that is arranged upright toward a diaphragm and is made annular and is integrally formed in a unitary main body;
a diaphragm including a thin plate-shaped elastic body an outer peripheral part of which has been fixed above an uppermost part of the valve seat in an upward extension of the main body which houses an actuator; and
a diaphragm spacer located on the opposite side of the valve seat with the diaphragm interposed therebetween,
wherein the valve seat, the diaphragm and the diaphragm spacer are coaxially disposed, and the valve seat has, on its top, an inclined surface which forms a concave surface declined to the inner peripheral side, a shape of a diaphragm pressing surface which forms a convex surface of the diaphragm spacer and the concave surface of the inclined surface on the top of the valve seat that is the abutting surface with the diaphragm are complementary spherical surfaces, and the diaphragm abuts against the inclined surface of the valve seat with no gap by pressing force of the diaphragm spacer.

2. The flow rate control valve according to claim 1, wherein in a valve-closed state, the inclined surface of the valve seat and the pressing surface of the diaphragm spacer that corresponds to the position of the inclined surface concerned come into engagement with each other via the diaphragm.

3. The flow rate control valve according to claim 1, wherein an outer diameter of the diaphragm pressing surface of the diaphragm spacer is larger than an outer diameter of the inclined surface of the valve seat.

4. A mass flow controller, comprising:
an inflow passage for a fluid;
a bypass passage that has been set to a predetermined flow ratio;
a sensor passage to which a predetermined flow rate is to be branched;
a flow rate sensor unit that detects a mass flow rate of the fluid that flows in the sensor passage;
an intermediate passage in which fluids that flow through the sensor passage and the bypass passage join together;
a flow rate control valve located between the intermediate passage and an outflow passage; and
a control circuit unit that controls the flow rate sensor unit and the flow rate control valve, wherein
the flow rate control valve has a valve seat that is a cylindrical body that is arranged upright toward a diaphragm and is made annular and is integrally formed in a unitary main body, a diaphragm including a thin plate-shaped elastic body an outer peripheral part of which has been fixed above an uppermost part of the valve seat in an upward extension of the main body which houses an actuator, and a diaphragm spacer located on the opposite side of the valve seat with the diaphragm interposed therebetween, and
the valve seat has, on its top, an inclined surface which forms a concave surface declined to the inner peripheral side, a shape of a diaphragm pressing surface which forms a convex surface of the diaphragm spacer and the concave surface of the inclined surface on the top of the valve seat that is the abutting surface with the diaphragm are complementary spherical surfaces, and the diaphragm abuts against the inclined surface of the valve seat with no gap by pressing force of the diaphragm spacer.

5. The mass flow controller according to claim 4, wherein in a valve-closed state, the inclined surface of the valve seat and the pressing surface of the diaphragm spacer that corresponds to the position of the inclined surface concerned come into engagement with each other via the diaphragm.

* * * * *